US006541933B1

(12) United States Patent
Leggate et al.

(10) Patent No.: US 6,541,933 B1
(45) Date of Patent: Apr. 1, 2003

(54) ANGLE CONTROL OF MODULATING WAVE TO REDUCE REFLECTED WAVE OVERVOLTAGE TRANSIENTS

(75) Inventors: David Leggate, New Berlin, WI (US); Russel J. Kerkman, Milwaukee, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 09/996,950

(22) Filed: Nov. 20, 2001

(51) Int. Cl.[7] .............................................. G05B 11/28
(52) U.S. Cl. ........................ 318/599; 318/808; 318/811
(58) Field of Search ................................. 318/599, 811, 318/808

(56) References Cited

U.S. PATENT DOCUMENTS 5,610,806 A * 3/1997 Blasko et al. .................. 363/41
5,912,813 A * 6/1999 Kerkman et al. ............ 318/811
5,990,654 A * 11/1999 Skibinski et al. ............ 307/105
6,014,497 A * 1/2000 Kerkman et al. ............ 318/254
6,023,417 A * 2/2000 Hava et al. .................. 318/811

* cited by examiner

Primary Examiner—Rita Leykin
(74) Attorney, Agent, or Firm—Michael A. Jaskolski; Alexander M. Gerasimow; William R. Walbrun

(57) ABSTRACT

Method and apparatus for eliminating greater than twice motor overvoltage by altering modulating signals provided to a PWM controller which in turn provides firing pulses to a PWM inverter. The modulating waves are altered by either tying them to positive or negative DC buses or limiting the maximum magnitudes to a maximum magnitude value above which modulating waveforms are known to cause greater than twice overvoltage. Pass through modulating waveform angles at which waveforms have to be modified are determined as a function of modulating waveform symmetries and the first pass through angle within a waveform cycle.

22 Claims, 8 Drawing Sheets

ANGLE CONTROL OF MODULATING WAVE TO REDUCE REFLECTED WAVE OVERVOLTAGE TRANSIENTS

STATEMENT REGARDING FEDERALLY SPONSORED RESEARCH

Not applicable.

CROSS-REFERENCE TO RELATED APPLICATIONS

Not applicable.

CROSS-REFERENCE TO RELATED APPLICATIONS

Not applicable.

BACKGROUND OF THE INVENTION

The present invention relates to motor controllers and more particularly, to a method and an apparatus for altering stator winding voltages to eliminate greater than twice over voltage as a function of modulating wave angle.

Many motor applications require that a motor be driven at various speeds. Motor speed can be adjusted with an Adjustable Speed Drive (ASD) which is placed between a voltage source and an associated motor that can excite the motor at various frequencies. One commonly used type of ASD uses a three-phase Pulse Width Modulated (PWM) inverter and associated PWM controller which can control both voltage and frequency of signals that eventually reach motor stator windings.

A three-phase PWM controller receives three reference or modulating signals and a triangle carrier signal, compares each modulating signal to the carrier signal and generates firing signals consisting of a plurality of pulses corresponding to each modulating signal. When a modulating signal has a greater instantaneous amplitude than the carrier signal, a corresponding firing signal is high producing a pulse on-time. When a modulating signal has an instantaneous amplitude that is less than the carrier signal, a corresponding firing signal is low producing a pulse off-time.

The firing signals are used to control the PWM inverter. A three-phase PWM inverter consists of three pairs of switches, each switch pair including series arranged upper and lower switches configured between positive and negative DC power supplies. Each pair of switches is linked to a unique motor terminal by a unique supply line, each supply line is connected to a node between an associated pair of switches. Each firing signal controls an associated switch pair to alternately connect a stator winding between the positive and negative DC power supplies to produce a series of high frequency voltage pulses that resemble the firing signals. A changing average of the high frequency voltage pulses over a period defines a fundamental low frequency alternating line-to-line voltage between motor terminals that drives the motor.

Insulated Gate Bipolar Transistors (IGBTs) are the latest power semiconductor switches used in the PWM inverter. IGBTs have fast rise times and associated switching speeds (e.g. 50–400 ns) that are at least an order of magnitude faster than BJTs and other similar devices. At IGBT switching speeds, switching frequency and efficiency, and the quality of terminal voltages, are all appreciably improved. In addition, the faster switching speeds reduce harmonic heating of the motor winding as well as reduce audible motor lamination noise.

While IGBT PWMs are advantageous for all of the reasons identified above, when combined with certain switch modulating techniques (i.e. certain on/off switching sequences), IGBT fast dv/dt or rise times can reduce the useful life of motor components and/or drive to motor voltage supply lines. In particular, while most motors and supply lines are designed to withstand operation at rated line voltages for long periods and to withstand predictable overvoltage levels for short periods, in many cases, fast switch rise times causes over voltages that exceed design levels.

For a long time the industry has recognized and configured control systems to deal with twice overvoltage (i.e. twice the PWM inverter DC power supply level) problems. As well known in the controls art, twice overvoltage levels are caused by various combinations of line voltage rise time and magnitude, imperfect matches between line-to-line supply cable and motor surge impedances, and cable length. Line voltage frequency and switch modulating techniques have little effect on twice overvoltage levels.

One common way to cope with twice overvoltage levels has been to reduce reflected voltage by terminating the cable supply lines at the motor terminals with a cable to motor surge impedance matching network. Resistor-Inductor-Capacitor or R-L-C filter networks mounted at the drive output are also used to change and reduce the slope of the voltage pulses (i.e. the turn on times) as they arrive. This network increases the cable distance where twice voltage in the motor terminals is developed to a length outside the application distance of interest. In addition, to reduce the possibility of damage from periodic twice overvoltage levels, most cable supply lines and motors are insulated to withstand periodic twice overvoltage levels. Thus, the industry has developed different system configurations for dealing with twice overvoltage.

Unfortunately, there is another potentially more damaging overvoltage problem that has not been satisfactorily dealt with. The second overvoltage problem is referred to herein as greater than twice overvoltage. Unlike twice overvoltage, greater than twice overvoltage is caused by faster IGBT switching frequencies and faster IGBT dv/dt rise times interacting with two different common switch modulating techniques, that result in overvoltage problems referred to as "double pulsing" and "polarity reversal".

Figure 1:
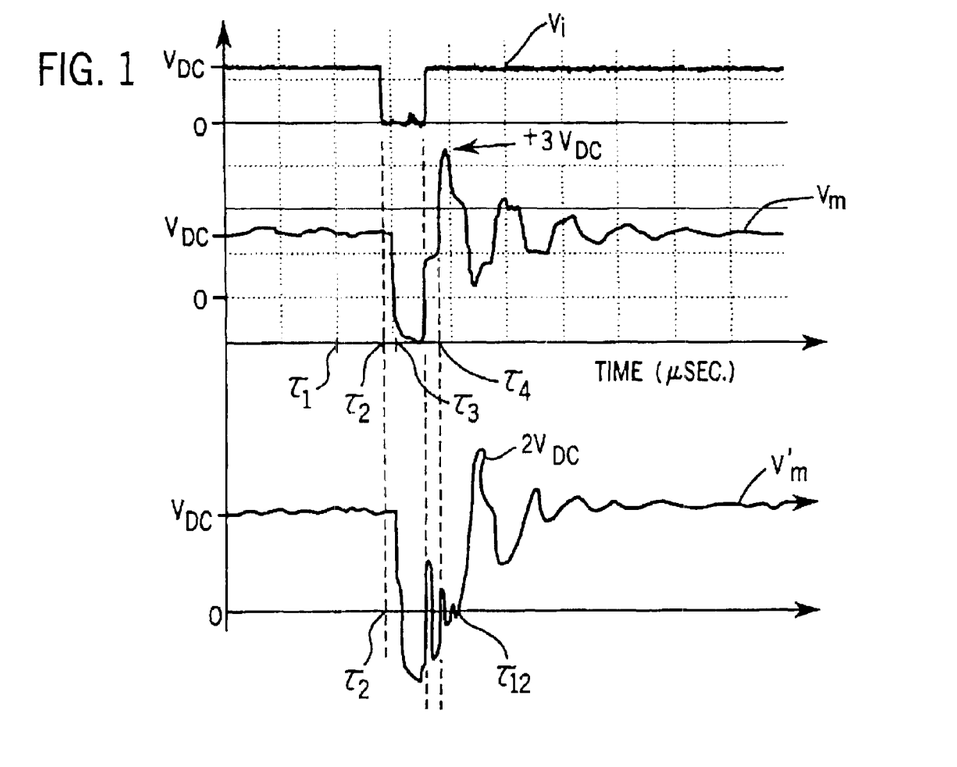
FIG. 1 is a graph that illustrates the greater than twice overvoltage phenomenon on the motor due to the inverter modulator double pulsing problem, an inverter line-to-line voltage generated by PWM firing signals, a resulting uncompensated line-to-line motor voltage of greater than twice voltage magnitude and a compensated line-to-line motor voltage limited to twice overvoltage by the described invention.

Referring to FIG. 1, double pulsing will be described in the context of an IGBT inverter generated line-to-line voltage $V_i$ applied to a line cable and a resulting motor line-to-line terminal voltage $V_m$. Initially, at time $T_1$, the line is shown in a fully-charged condition ($V_i(T_1)=V_m(T_1)=V_{DC}$). A transient motor voltage disturbance is initiated in FIG. 1 by discharging the line at the inverter output to zero voltage, starting at time $T_2$, for approximately 4 μsec. The pulse propagation delay between the inverter terminals and motor terminals is proportional to cable length and is approximately 1 μsec for the assumed conditions. At time $T_3$, 1 μsec after time $T_2$, a negative going $V_{DC}$ voltage has propagated to the motor terminals. In this example, a motor terminal reflection coefficient $\Gamma_m$ is nearly unity. Thus, the motor reflects the incoming negative voltage and forces the terminal voltage $V_m$ to approximately negative bus voltage:

$$V_m(T_3)=V_m(T_1)-V_{DC}(1+\Gamma_m)\approx-V_{DC} \qquad \text{Eq. 1}$$

A reflected wave ($-V_{DC}$) travels from the motor to the inverter in 1 μsec and is immediately reflected back toward the motor. Where an inverter reflection coefficient $\Gamma_i$ is approximately negative unity, a positive $V_{DC}$ pulse is reflected back toward the motor at time $T_4$. Therefore, at time $T_4$ the discharge at time $T_2$ alone causes a voltage at the motor terminal such that:

$$V_m(T_4)=V_m(T_1)-V_{DC}(1+\lceil_m)-V_{DC}\lceil_i\lceil_m(1+\lceil_m)\approx V_{DC} \qquad \text{Eq. 2}$$

In addition, at time $T_4$, with the motor potential approaching $V_{DC}$ due to the $T_2$ discharge, the inverter pulse $V_i(T_4)$ arrives and itself recharges the motor terminal voltage to $V_{DC}$. Pulse $V_i(T_4)$ is reflected by the motor and combines with $V_m(T_4)$ to achieve a peak value of approximately three times the DC rail value:

$$V_m(T_4+)=V_m(T_1)-V_{DC}(1+\lceil_m)-V_{DC}\lceil_i\lceil_m(1+\lceil_m)+V_i(T_4)(1+\lceil_m)\approx 3V_{DC} \qquad \text{Eq. 3}$$

Figure 2:
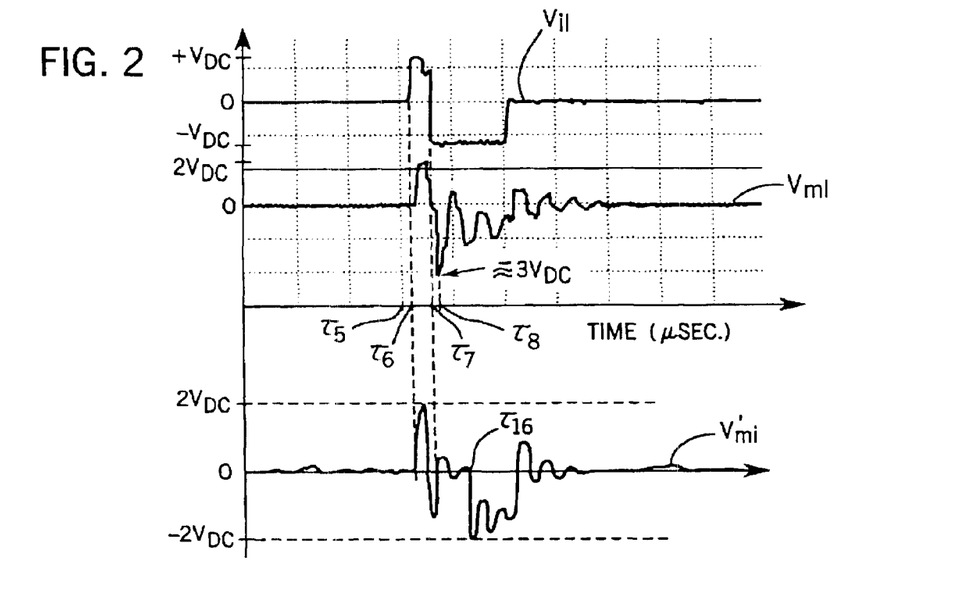
FIG. 2 is a graph that illustrates greater than twice overvoltage phenomenon on the motor due to the inverter modulated polarity reversal problem, FIG. 2 consists of an inverter line-to-line voltage generated by the PWM modulator firing signals, a resulting uncompensated line-to-line motor voltage of greater than twice voltage magnitude and a compensated line-to-line motor voltage limited to twice overvoltage by the invention.

Referring to FIG. 2 polarity reversal will be described in the context of an IGBT inverter generated line-to-line voltage $V_{il}$, and a resulting motor line-to-line voltage $V_{ml}$. Polarity reversal occurs when the firing signal of one supply line is transitioning into overmodulation while the firing signal of another supply line is simultaneously transitioning out of overmodulation. Overmodulation occurs when a reference signal magnitude is greater than the maximum carrier signal magnitude so that the on-time or off-time of a switch is equal to the duration of the carrier period. Polarity reversal is common in all types of PWM inverter control.

Initially, the inverter line-to-line voltage $V_{il}(T_5)$ is zero volts. At time $T_6$, the inverter voltage $V_{il}(T_6)$ is increased to $V_{DC}$ and, after a short propagation period, a $V_{DC}$ pulse is received and reflected at the motor terminals thus generating a $2V_{DC}$ pulse across associated motor lines. At time $T_7$, the line-to-line voltage switches polarity (hence the term polarity reversal) so that the inverter voltage $V_{il}(T_7)$ is equal to $-V_{DC}$ when the line-to-line motor voltage $V_{ml}(T_7)$ has not yet dampened out to a DC value (i.e. may in fact be $2V_{DC}$). After a short propagation period, the $-V_{DC}$ inverter pulse reaches the motor, reflects, and combines with the inverter reflected pulse $-V_{DC}$ and the positive voltage $2V_{DC}$ on the motor. The combination generates an approximately $-3V_{DC}$ line-to-line motor voltage $V_{ml}(T_8)$ at time $T_8$.

In reality, the amplitude of overvoltages will often be less than described above due to a number of system variables including line AC resistance damping characteristics, DC power supply level, pulse dwell time, carrier frequency $f_c$, modulation techniques, and less than unity reflection coefficients ($\lceil_m$).

One solution to the double pulsing problem has been to increase the zero voltage dwell time between line-to-line inverter pulses. In other words, referring again to FIG. 1, the discharge time between pulses would be extended from the present 4 μsecs so that, prior to the second pulse $V_i(T_4)$ reaching the motor terminals, the motor terminal voltage transient $V_m$ reaches a steady state DC value.

Figure 3:
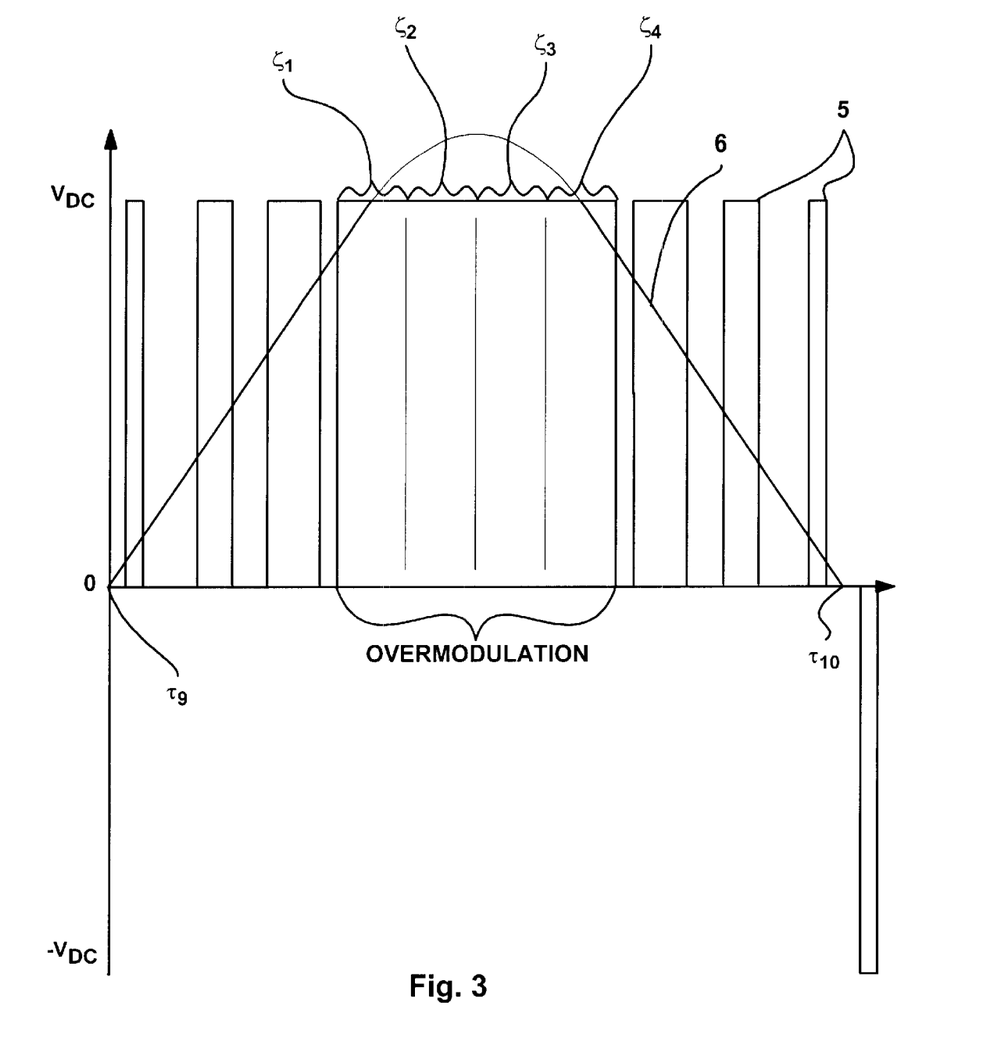
FIG. 3 is a graph illustrating the high frequency pulse width modulating voltage pulses and a resulting low frequency fundamental terminal voltage.

While increasing the zero voltage dwell time between line-to-line inverter pulses eliminates greater than twice overvoltage due to double pulsing, this solution can disadvantageously reduce the amplitude of the resulting fundamental low frequency terminal voltage where high carrier frequencies and overmodulation occurs. For example, referring to FIG. 3, a series of high frequency voltage pulses 5 at a motor terminal and a resulting fundamental low frequency terminal voltage 6 can be observed. In FIG. 3, a positive phase of the low frequency voltage begins at $\tau_9$ and ends at $\tau_{10}$.

To eliminate greater than twice over voltage, one pulse limiting scheme indiscriminately increases the duration of each off time period that is less than a minimum allowable off time. In FIG. 3, the off times of pulses during the overmodulation period (i.e., $\zeta_1-\zeta_4$) are equal to associated carrier periods and therefore are greater than the maximum on time and thus all would be limited. In addition, in many cases greater than twice over voltage will occur prior to and just after overmodulation. Thus, referring still to FIG. 3, during periods just before period $\zeta_1$, and just after period $\zeta_4$, off times will also often be limited. Where the magnitude of the DC power supply is reduced substantially, the number of overmodulation carrier periods having limited on-times increases proportionally until, at some point, the reduced on-time noticeably affects the low frequency terminal voltage magnitude. In other words, maximum power output is substantially reduced through blind limitation of firing pulses during overmodulation.

While FIG. 3 is only exemplary, it can be seen that during the positive phase (i.e. $T_9-T_{10}$) the four firing pulses that would normally occur during carrier periods $\zeta_1-\zeta_4$ would all be limited to a maximum on-time according to prior art methods of reducing greater than twice overvoltage. In addition, pulses during periods just before period $\zeta_1$ and just after period $\zeta_4$ may also be limited. In many cases, especially where the DC supply magnitude is minimal or reduced, the reduction in low frequency terminal voltage is unacceptable.

In addition to reducing the magnitude of the fundamental low frequency voltage 6, this solution does not address the polarity reversal problem.

Another solution to the greater than twice overvoltage problem is described in U.S. Pat. No. 5,671,130 entitled METHOD AND APPARATUS FOR CONTROLLING VOLTAGE REFLECTIONS USING A MOTOR CONTROLLER which was issued on Sep. 23, 1997 and is commonly owned with this application. According to this solution a motor controller modifies firing pulses that are provided to an inverter in a manner calculated to eliminate greater than twice overvoltage switching sequences. When the period between two voltage changes is less than the period required for a substantially steady state voltage near zero to be reached, the period between the two changes is increased. Where overmodulation switching sequences result in greater than twice overvoltage due to polarity reversal, the overmodulation switching sequence is altered to eliminate the possibility of greater than twice overvoltage.

This solution contemplates two different methods of altering the switching sequence referred to as the Maximum-Minimum Pulse Technique (MMPT) and the Pulse Elimination Technique (PET) methods. According to the MMPT method, when a PWM pulse has characteristics which could generate greater than twice overvoltage, the pulse width is altered so that its duration is set equal to or between the minimum and maximum pulse times allowed. Importantly, only pulses that cross the threshold level for double pulsing induced motor voltages greater than twice overvoltage and during polarity reversal periods are altered so that the resulting terminal voltage magnitude is only minimally effected. Nevertheless, the terminal voltage magnitude is noticeably reduced as some positive pulse durations during positive half cycles and some negative pulse durations during negative half cycles are reduced when the MMPT method is employed.

According to the PET method, instead of only limiting pulses to within the maximum and minimum pulse times, some of the pulses having characteristics that could generate greater than twice overvoltage are eliminated. In other words, some of the positive pulse durations during positive half cycles are increased and set equal to the carrier period and some of the negative pulse durations are increased and set equal to the carrier period which tend to offset the reduced pulse durations. The result is a terminal voltage magnitude which is essentially unaffected by pulse alterations.

While this solution effectively eliminates greater than twice overvoltage while maintaining a desired terminal voltage, this solution requires a relatively large amount of signal monitoring and comparing to determine which PWM pulses are likely to generate greater than twice overvoltage. For this reason, it may be difficult to implement this solution using the simple microprocessors which are provided in many motor controllers.

Another solution is described in U.S. Pat. No. 5,912,813 (herein after "the '813 patent") which is also entitled METHOD AND APPARATUS FOR CONTROLLING VOLTAGE REFLECTIONS USING A MOTOR CONTROLLER which was filed on Oct. 1, 1997 and is commonly owned with this application. The '813 patent teaches a system that modifies the PWM modulating waveforms in ways that reflect the PET and MMPT methods in an effort to reduce reflected wave overvoltage transients. To determine how to modify the modulating waveforms, the '813 patent first identifies a maximum waveform voltage value $V_{mv}$ (in the '812 patent $V'_{Ta}$) above which greater than twice overvoltage is known to occur by mathematically combining a DC bus voltage magnitude, a carrier period signal and a known dwell time value (i.e., duration required for transients to settle to acceptable levels after switching). Thereafter, the '813 patent teaches that the modulating signal is compared to the maximum voltage value $V_{mv}$, and, when the modulating signal magnitude exceeds the maximum voltage value $V_{mv}$, the modulating signal is modified by either clamping the modulating signal value to the maximum positive or negative voltage value $V_{mv}$ or by clamping the modulating signal to one of the DC buses, depending on modulating signal polarity and magnitude. More specifically, where the periods during which the modulating signal value exceeds the maximum voltage value are overvoltage periods, during the first and last N carrier cycle periods of each overvoltage period, the '813 patent teaches that the modulating signal magnitude is clamped to the maximum voltage magnitude value and, there between, the modulating signal is clamped to one of the DC buses. Each portion of the modulating signals that occurs during the N carrier cycles is generally referred to as "porch".

Unfortunately, even systems of the type described in the '813 patent have some inherent limitations. For instance, the '813 methods are generally limited by the ability of embedded controllers used to identify and compare high resolution voltages. This is particularly true regarding the steps that require determining when the modulating waveform "passes through" the maximum voltage magnitude value where errors have been known to occur. Errors in the voltage resolution cause line current distortions as the modulator goes into and out of PET operation. As well known in the industry, any current distortions cause torque pulsations, harmonic losses and sampling distortions and adversely affect voltage-frequency drive stability.

Therefore, it would be advantageous to have a method and apparatus that could eliminate greater than twice overvoltage without causing excessive current distortions and which is relatively simple to implement.

SUMMARY OF THE INVENTION

It has been recognized that, instead of trying to precisely identify all of the times at which the modulating waveforms equal or pass through the maximum voltage magnitude value and adjusting the modulating waveforms accordingly, better and easier to implement results can be obtained by symmetrically altering the modulating waveform as a function of a modulating waveform angle. The modulating waveform angle can be easily tracked and predetermined symmetric modulating waveform angles can be identified so that, upon sensing the angle herein referred to as a pass through angle) at which a modulating waveform first equals the maximum voltage magnitude value during a cycle, waveform modifications for the entire waveform cycle can be determined. More specifically, the first pass through angle during a modulating waveform cycle can be used to identify all other pass through angles during the cycle. Thereafter the modulating waveform is modified to include porches at each pass through angle and to clamp the waveform to the positive or negative DC buses during other waveform segments thereby generating modified modulating waveforms that will not cause greater than twice overvoltage on the load lines.

To this end the invention includes a method to be used with a motor controller including a signal generator, a PWM controller and an inverter, the generator providing modulating waveforms to the PWM controller which compares the modulating waveforms with a carrier signal to generate firing pulses which control the inverter, the inverter providing exciting voltage to a motor corresponding to the firing pulses, the voltage having a maximum intended amplitude, the method for substantially eliminating greater than twice motor overvoltage by modifying the modulating waveforms to provide modified modulating waveforms. The method comprises the steps of, for each modulating waveform, determining a maximum voltage magnitude of the modulating waveform above which greater than twice motor overvoltage is known to occur, comparing the modulating waveform to the maximum voltage magnitude, when the modulating waveform magnitude equals the maximum voltage magnitude, identifying the modulating waveform angle as a first pass through angle, using the first pass through angle to identify at least one subsequent pass through angle at which the modulating waveform should equal the maximum voltage magnitude and modifying the modulating waveform as a function of the first and at least one subsequent pass through angles thereby providing a modified waveform having characteristics which do not cause greater than twice overvoltage.

In one embodiment the modulating waveform occurs over a $2\pi$ period, the inverter generates the firing pulses by alternately connecting motor phases between positive and negative DC buses, during each half cycle of the modulating waveform, the modulating waveform magnitude is greater than the maximum voltage magnitude during an overvoltage period, $\phi_H$ is a porch angle corresponding to N carrier signal periods and is set by a controller operator, the step of identifying the modulating waveform angle includes the step of identifying the angle at which the modulating waveform passes through the maximum magnitude value after the waveform passes from a negative value through zero to a positive value and, the step of using the pass through angle to identify at least one subsequent pass through angle includes the step of identifying a fourth angle as $\pi$ less the first pass through angle. Here, the step of modifying includes the steps of identifying a second angle as the first pass through angle plus porch angle $\phi_H$, a third angle as $\pi$ less the sum of (the first pass through angle and the porch angle $\phi_H$) and, during the $2\pi$ modulating waveform segment following the first pass through angle (i) setting the modulating waveform equal to the positive maximum voltage magnitude between the first and second angles and between the third and fourth angles and (ii) setting the modulating waveform equal to the negative maximum voltage magnitude between the first angle plus $\pi$ and second angle plus $\pi$ and between the third angle plus a and fourth angle plus $\pi$.

The step of modifying may further include the steps of setting the modulating waveform equal to the positive DC bus value between the second and third angles and setting the modulating waveform equal to the negative DC bus value between the second angle plus $\pi$ and the third angle plus $\pi$.

The step of modifying may further include the steps of determining if the modulating waveform is a uni-arc waveform (i.e., a waveform having a positive half cycle that increases in magnitude from zero to a maximum waveform amplitude and then decreases in magnitude to the next zero value) or a bi-arc waveform (i.e., a waveform having a positive half cycle that increases in value from zero to a maximum waveform amplitude, decreases to an intermediate value greater than zero, increases from the intermediate value up to a second maximum amplitude and then decreases from the second maximum amplitude to the next zero value) and, if the modulating waveform is a bi-arc waveform, comparing the modulating angle to a threshold angle and, where the modulating angle is greater than the threshold angle, further modifying the modulating waveform.

Thus, it has also been recognized that, when the modulating waveform is a bi-arc waveform and the first pass through angle is less than a threshold angle, the modulating waveform will pass through the maximum magnitude value more than twice during each half (i.e., positive or negative) of the waveform cycle and therefore additional modifications have to be made to eliminate greater than twice overvoltage conditions. The threshold angle is typically $\pi/6$.

Where the first pass through angle is less than the threshold angle the step of further modifying may include the steps of identifying a fifth angle as $2\pi/3$ less the sum of (the first pass through angle and the porch angle $\phi_H$), identifying a sixth angle as $2\pi/3$ less the first pass through angle, identifying a seventh angle as $\pi/3$ plus the first pass through angle and identifying an eighth angle as $\pi/3$ plus the sum of (the first pass through angle and the porch angle $\phi_H$). during the $2\pi$ modulating waveform segment following the first pass through angle (i) setting the modulating waveform equal to the positive maximum voltage magnitude between the fifth and sixth angles and between the seventh and eighth angles and (ii) setting the modulating waveform equal to the negative maximum voltage magnitude between the fifth angle plus $\pi$ and sixth angle plus $\pi$ and between the seventh angle plus $\pi$ and eighth angle plus $\pi$.

Moreover, where the first pass through angle is less than the threshold angle the step of modifying may further include the steps of, setting the modulating waveform equal to the positive DC bus value between the second and fifth angles and between the eighth and third angles and setting the modulating waveform equal to the negative DC bus value between the second angle plus $\pi$ and fifth angle plus $\pi$ and between the eighth angle plus $\pi$ and third angle plus $\pi$.

Furthermore, the step of modifying may also include the steps of, when the first pass through angle is less than or equal to the threshold angle, setting the modulating waveform equal to the positive DC bus value between the second and third angles and setting the modulating waveform equal to the negative DC bus value between the second angle plus $\pi$ and third angle plus $\pi$.

The method may include repeating the steps described above every $2\pi$ segment of the modulating waveform.

The invention further includes an apparatus for performing the methods described above. More specifically, the may include hardware specifically configured to perform the methods described above or, in the alternative, may include a processor running a pulse sequencing program to perform the methods described above.

Thus, it should be appreciated that an extremely simple and accurate method and apparatus for modifying any type (i.e., uni-arc or bi-arc) of modulating waveform has been described herein where the resulting waveform will not cause greater than twice overvoltage.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefore, to the claims herein for interpreting the scope of the invention.

DESCRIPTION OF THE PREFERRED EMBODIMENT

A. Theory

For the purpose of simplifying this explanation, when a voltage magnitude rises from below to above a maximum magnitude value $V_{mv}$, the process will be referred to as "passing through" the maximum value positively. Similarly, when a voltage magnitude drops from above to below the maximum magnitude value, the process will be referred to as passing through the maximum value negatively. In addition, angles at which a modulating waveform pass through the maximum value will be referred to generally as pass through angles. Moreover, in order to further simplify this explanation, unless indicated otherwise, the present invention will generally be described with reference to a positive half of a modulating waveform and it should be recognized that the invention is meant to be applied as well to the negative half cycle.

Generally, the present invention is provided to modify modulating waveforms so that the modified waveforms will not cause greater than twice overvoltages to occur on load supply lines and to accomplish this task without adversely affecting the line voltages and currents. To this end, as described above and as well known in the controls industry, greater than twice overvoltages can be avoided by either maintaining modulating waveform magnitudes below a maximum voltage value $V_{mv}$ that is known to cause greater than twice overvoltage thereby creating a "porch" in the waveform or by clamping the waveform to one of the DC buses (depending on polarity). Porches generally reduce the resulting line voltage and current magnitudes while clamping action generally increases the resulting line voltage and current magnitudes. Thus, by employing both clamping and porch formation together and in suitable relative amounts, the affects on line voltage and current magnitudes can essentially be cancelled so that commanded magnitudes result and distortion is limited. More specifically, this is accomplished by identifying each instance when the modulating waveform passes either positively or negatively through the maximum magnitude value, providing a porch at each identified instance and clamping to one of the DC rails (as a function of polarity) between porches when the waveform magnitude exceeds the maximum value.

The present invention identifies the instances at which the modulating waveform passes through the maximum value in a unique way. Generally, the invention identifies a single pass through angle during a waveform cycle and, based on known waveform symmetries, calculates the other pass through angles that occur during the duration of the following cycle. Thereafter, the invention modifies the modulating waveform by providing porches at each pass through angle and clamping to either positive or negative DC rails (depending on modulating waveform polarity) between porches when the waveform magnitude exceeds the maximum magnitude value. In a particularly useful embodiment the invention identifies the first pass through angle during a cycle where the cycle starts at a point when a modulating waveform passes through the zero value from negative to positive.

Some general discussion regarding modulating waveforms and their symmetries is helpful in understanding the basis for the present invention. To this end, while there are several different types of modulating waveforms, the waveforms generally can be divided into two different types including uni-arc and bi-arc types. As the name implies, uni-arc waveforms are characterized by a single arc or generally smooth curve during each half cycle. An example of a uni-arc waveform is a sine wave that, during an exemplary positive half cycle beginning at a zero crossing, increases in magnitude with a decreasing rate of increase up to an angle $\pi/2$ and thereafter decreases in magnitude with an increasing rate of decrease to the next zero crossing at angle $\pi$. Each uni-arc waveform is symmetrical about angle $\pi/2$.

Similarly, as the name implies, a bi-arc waveform is characterized by two connected arc segments or curves during each half cycle. An exemplary bi-arc waveform is a space vector waveform like waveform 6 illustrated in FIG. 5. As illustrated, waveform 6, during the first half of a positive half cycle 200, increases in magnitude from 0 to $\pi/6$, then increases in magnitude at a decreasing rate of increase up to angle $\pi/3$ and then decreases in magnitude at an increasing rate of decrease up to angle $\pi/2$. Thereafter the second half or the positive half cycle 200 begins at angle $\pi/2$ and again increases in magnitude at a decreasing rate of increase up to angle $2\pi/3$, then decreases in magnitude at an increasing rate of decrease up to angle $5\pi/6$ and then decreases at a constant rate down to angle $\pi$. Again, as in the case of the uni-arc waveforms each bi-arc waveform, is symmetrical about angle $\pi/2$.

Figure 5:
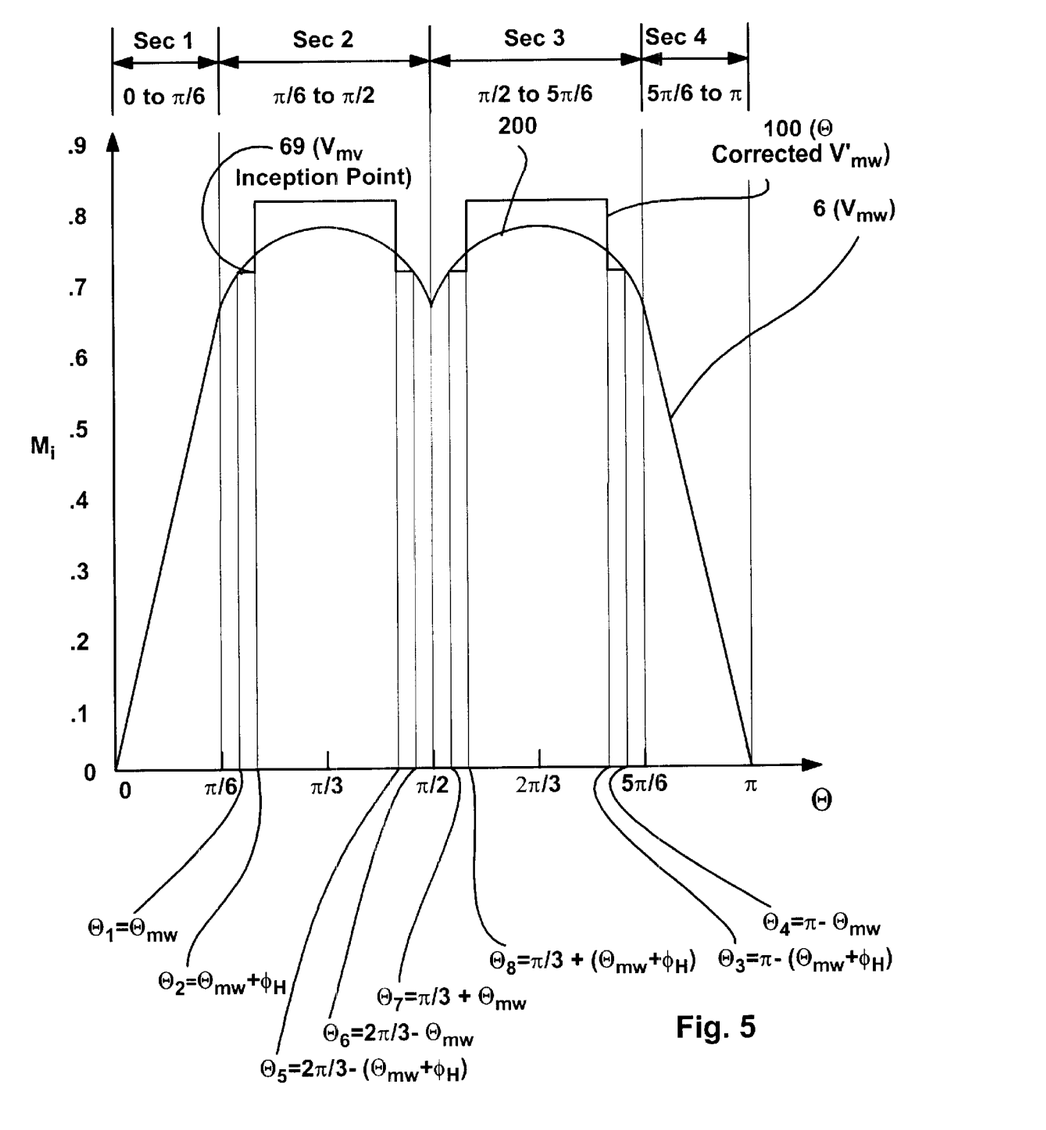
FIG. 5 is a graph illustrating an exemplary space vector modulating waveform and a modified modulating waveform that has been modified in accordance with the present invention.

Referring still to FIG. 5, positive half cycle 200 of waveform 6 can be divided into separate angle defined sectors including a first sector 1 between 0 and $\pi/6$, a second sector 2 between $\pi/6$ and $\pi/2$, a third sector 3 between $\pi/2$ and $5\pi/6$ and a fourth sector 4 between $5\pi/6$ and $\pi$.

Consistent with the above sector breakdown, various observations can be made with respect to all modulating waveforms including both uni-arc and bi-arc waveforms. First, the first half of each half cycle is symmetrical with respect to the second half of the half cycle about angle $\pi/2$. Thus, for example, as illustrated in FIG. 5, the cycle segment that occurs during sectors 1 and 2 is symmetrical with the cycle segment that occurs during sectors 3 and 4. Second, the waveform magnitude within the second sector 2 is at its minimum value at angle $\pi/6$ while the magnitude within the third sector 3 is at its minimum value at angle $5\pi/6$ (i.e., the magnitudes within segments 2 and 3 are minimal at the beginning and end of each of those sectors, respectively).

Also consistent with the above sector breakdown and referring still to FIG. 5, it is observed that, with respect to bi-arc waveforms, those waveforms are symmetrical within second sector 2 about angle $\pi/3$ and are also symmetrical within sector 3 about angle $2\pi/3$. Thus, within sector 2 of a bi-arc waveform, in addition to having a minimum value at angle $\pi/6$, the waveform will also have an identical minimum value at angle $\pi/2$. Similarly, for a bi-arc segment within sector 3, in addition to having a minimum value at angle $5\pi/6$, the waveform will have a minimum value at angle $\pi/2$.

Furthermore, it is noted that, with respect to uni-arc waveforms, those waveforms, if at all, only pass through the maximum voltage value level once on the way up to a peak modulating waveform magnitude and once on the way down to the next zero crossing.

Given these observations it has been further recognized that, with respect to positive half cycles of uni-arc waveforms, whenever the modulating waveform passes through the maximum voltage value $V_{mv}$ positively (i.e., from below to above the value $V_{mv}$) at a pass through angle $\Theta_{mw}$, the waveform passes back through the maximum value $V_{mv}$ negatively at an angle $\pi - \Theta_{mw}$. In this case, by providing a first porch at the waveform angle $\Theta_{mw}$ and a second porch at the waveform angle $\pi - \Theta_{mw}$ and clamping the waveform to the positive DC rail (i.e., a rail consistent with waveform polarity) between the porches, a modified modulating waveform consistent with the goals of the present invention is generated. To this end, where a suitable porch angle is $\phi_H$ (i.e., an angle corresponding to a dwell time $T_\alpha$ needed for switching transients to decay), first, second, third and fourth angles $\Theta_1$, $\Theta_2$, $\Theta_3$, and $\Theta_4$, respectively, during the half cycle can be identified as:

$$\Theta_1 = \Theta_{mw} \quad \text{Eq. 4}$$

$$\Theta_2 = \Theta_{mw} + \phi_H \quad \text{Eq. 5}$$

$$\Theta_3 = \pi - (\Theta_{mw} + \phi_H) \quad \text{Eq. 6}$$

$$\Theta_4 = \pi - \Theta_{mw} \quad \text{Eq. 7}$$

where angles $\Theta_1$ and $\Theta_4$ are pass through angles and angles $\Theta_2$ and $\Theta_3$ are porch delimiting angles (hereinafter "delimit angles") corresponding to each of $\Theta_1$ and $\Theta_4$, respectively. The first porch can be formed between first and second angles $\Theta_1$ and $\Theta_2$, the second porch can be formed between the third and fourth angles $\Theta_3$ and $\Theta_4$ and the waveform can be clamped to the DC rail between second and third angles $\Theta_2$ and $\Theta_3$. Prior to first angle $\Theta_1$ and after fourth $\Theta_4$ angle the modified waveform follows the original modulating waveform.

While not described here in detail, after the angles for the positive half cycle of a waveform have been determined, the angles for inserting porches and causing clamping for the negative half cycle can be determined by simply adding $\pi$ to each of the first through fourth angles as identified in Equations 4 through 7 above. For instance, a first porch during the negative half cycle that follows the positive half cycle corresponding to Equations 4 through 7 should be provided between angles $\Theta_n = \Theta_{mw} + \pi$ and $\Theta_{n+1} = \Theta_{mw} + \phi_H + \pi$, and so on.

Figure 6:
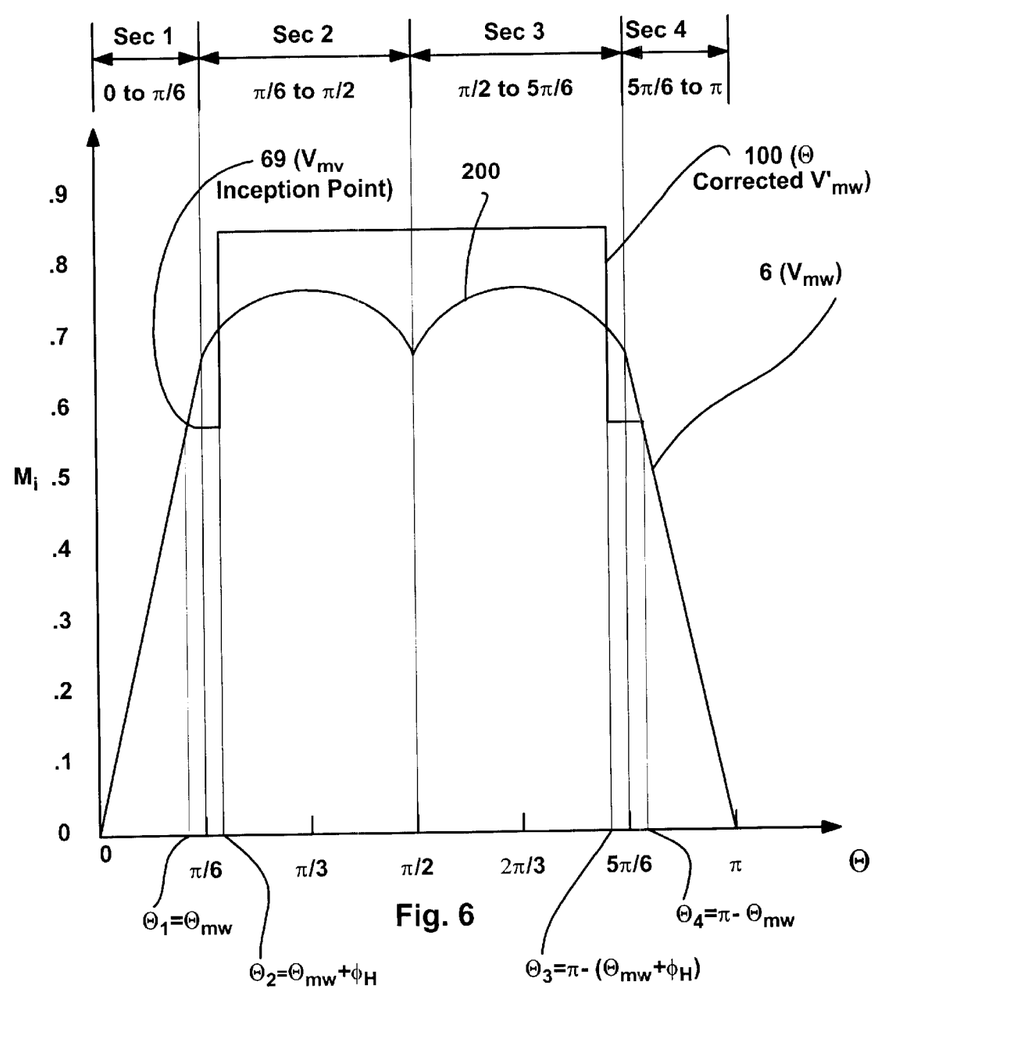
FIG. 6 is similar to FIG. 5, albeit illustrating a modified waveform having a slightly different set of characteristics.

Turning to the cases involving bi-arc waveforms, additional observations can be made. Specifically, referring to FIG. 6, when the modulating waveform 6 exceeds the maximum voltage value $V_{mv\,69}$ in the first sector 1 (i.e., prior to angle $\pi/6$), the modulating waveform magnitude will remain above the maximum voltage value 69 for the durations of the second and third sectors 2 and 3, respectively, and for a portion of fourth sector 4. In this case, Equations 4 and 7 are applicable for identifying the pass through angles $\Theta_1$, $\Theta_4$ and Equations 5 and 6 can be used to identify delimit angles $\Theta_2$ and $\Theta_3$. Thereafter, in a fashion similar to that described above with respect to the uni-arc waveforms, a first porch can be formed between first and second angles $\Theta_1$ and $\Theta_2$, the second porch can be formed between the third and fourth angles $\Theta_3$ and $\Theta_4$ and the waveform can be clamped to the DC rail between second and third angles $\Theta_2$ and $\Theta_3$, respectively. Prior to first angle $\Theta_1$ and after fourth angle $\Theta_4$, the modified waveform follows the original modulating waveform.

Referring again to FIG. 5, when the modulating waveform 6 does not pass through the maximum voltage value 69 during the first sector 1, but passes through the maximum value 69 at a first angle $\Theta_1$ in second sector 2 (i.e., between $\pi/6$ and $\pi/2$), because of the symmetry about angle $\pi/2$, the waveform 6 drops below the maximum value 69 at a fourth angle $\Theta_4$ within third sector 3 on its way to the next zero crossing at angle $\pi$ where fourth angle $\Theta_4$ is represented by Equation 7 above. Thus, as in the case of the uni-arc waveform described above, Equations 4 through 7 can be solved for first through fourth angles $\Theta_1$, $\Theta_2$, $\Theta_3$, and $\Theta_4$, respectively, and the angles can then be used to provide first and second porches between the first and second angles and between the third and fourth angles, respectively.

In addition, because of symmetry within the second sector 2 about angle $\pi/3$ and the fact that, at $\pi/6$ the modulating waveform is below the maximum value 69, prior to the end of the second sector at $\pi/2$, the waveform segment in sector 2 drops below the maximum value 69 and therefore there is a second sector 2 pass through angle $\Theta_6$. Thus, to avoid greater than twice overvoltage due to second pass through angle $\Theta_6$, another porch has to be provided at second pass through angle $\Theta_6$. Because waveform 6 is symmetrical about angle $\pi/3$ within sector 2 and therefore is symmetrical between angles 0 and $2\pi/3$ (i.e., angle $\pi/3$ bisects the arc between angles 0 and $2\pi/3$) and because the first value crossing within sector 2 is at angle $\Theta_{mw}$ (i.e., $0+\Theta_{mw}$), the second sector 2 pass through angle $\Theta_6$ is at angle $2\pi/3 - \Theta_{mw}$.

Moreover, referring still to FIG. 5, because of symmetry within the third sector 3 about angle $2\pi/3$ and the fact that, at angle $5\pi/6$ the modulating waveform is below the maximum value 69, at angle $\pi/2$ the waveform segment in sector 3 is below the maximum value 69 and there is a pass through angle $\Theta_7$ within third sector 3 prior to the pass through angle $\Theta_4$. Herein angle $\Theta_7$ will be referred to as a first sector 3 pass through angle while angle $\Theta_4$ will be referred to as a second sector 3 pass through angle because angle $\Theta_7$ occurs prior to angle $\Theta_4$. To avoid greater than twice overvoltage at first sector 3 pass through angle $\Theta_7$, one more porch (i.e., for a total of four porches) has to be provided at first sector 3 pass through angle $\Theta_7$. Because waveform 6 is symmetrical about angle $2\pi/3$ within sector 3 and therefore is symmetrical between angles $\pi/3$ and $\pi$ (i.e., angle $2\pi/3$ bisects the arc between angles $\pi/3$ and $\pi$) and because second sector 3 pass through angle $\Theta_4$ is at angle $\pi - \Theta_{mw}$, first sector 3 pass through angle $\Theta_7$ is at angle $\pi/3 + \Theta_{mw}$. Delimit angles $\Theta_5$ and $\Theta_8$ for each of the sixth and seventh angles $\Theta_6$ and $\Theta_7$, respectively, can be determined by subtracting and adding porch angle $\phi_H$ from each of the sixth and seventh angles, respectively. In summary, angles $\Theta_5$, $\Theta_6$, $\Theta_7$, and $\Theta_8$ for defining two additional and necessary porches can be determined by solving the following equations:

$$\Theta_5 = 2\pi/3 - (\Theta_{mw} + \phi_H) \quad \text{Eq. 8}$$

$$\Theta_6 = 2\pi/3 - \Theta_{mw} \quad \text{Eq. 9}$$

$$\Theta_7 = \pi/3 + \Theta_{mw} \quad \text{Eq. 10}$$

$$\Theta_8 = \pi/3 + (\Theta_{mw} + \phi_H) \quad \text{Eq. 11}$$

After angles $\Theta_1$ through $\Theta_8$ have been identified, referring still to FIG. 5, first through fourth porches can be formed between angles $\Theta_1$ and $\Theta_2$, angles $\Theta_5$ and $\Theta_6$, angles $\Theta_7$ and $\Theta_8$ and angles $\Theta_3$ and $\Theta_4$, respectively, with the modified modulating waveform clamped to the positive DC bus between angles $\Theta_2$ and $\Theta_5$ and between angles $\Theta_8$ and $\Theta_3$ and following the original modulating waveform between angles 0 and $\Theta_1$ and between angles $\Theta_4$ and $\pi$.

While not described here in detail, after the angles for the positive half cycle have been determined, the angles for inserting porches and causing clamping for the negative half cycle can again be determined by simply adding $\pi$ to each of the first through eighth angles as identified in Equations 4 through 11 above. For instance, a first porch during the negative half cycle that follows the positive half cycle corresponding to Equations 4 through 11 would be provided at angles $\Theta_n = \Theta_{mv} + \pi$ and $\Theta_2 = \Theta_{mw} + \phi_H + \pi$ and so on.

B. Dwell Time $T_\alpha$ and Maximum Modulating Waveform Magnitude $V_{mv}$

One method for identifying the critical dwell time $T_\alpha$ required to have a reflected wave voltage transient oscillation decay to zero before the arrival of a next PWM pulse is described in the '813 patent referenced above. In addition, the '813 patent teaches one method for combining the critical dwell time $T_\alpha$, the DC bus voltage $V_{DC}$ value and the carrier period $T_c$ to determine a maximum modulating waveform magnitude $V_{mv}$ that can be achieved without causing greater than twice overvoltage. The '813 patent is incorporated herein by reference in its entirety and, specifically, for its $T_\alpha$ and $V_{mv}$ determining methods. Nevertheless it should be understood that other methods for determining $T_\alpha$ and $V_{mv}$ are contemplated and that the present invention does not depend for novelty on which methods are employed.

C. Hardware

The present invention will be described in the context of the exemplary PWM inverter 9 shown in FIG. 4. Inverter 9 is shown connected to a modulating waveform generator 20, a modulating waveform modifier 7, a PWM controller 11, a DC voltage source 18, and a motor 19. Inverter consists of six solid state switching devices 12–17 (BJT, GTO, IGBT or other transistor technology devices may be used) arranged in series pairs, each switching device 12–17 being coupled with an inverse parallel connected diode 23–29.

Each series arranged pair of switching devices 12 and 13, 14 and 15, and 16 and 17, make up a separate leg 39, 40 or 41 of the inverter 9 and have a common node which is electrically connected to a unique motor terminal 30, 31, or 32 (and thus to a unique stator winding 35, 36 or 37). Source 18 is split so that it creates a high voltage rail 48 and a low voltage rail 49 and each leg 39, 40, 41 connects the high voltage rail 48 to the low voltage rail 49.

Each switching device 12–17 is also electrically connected by a firing line 51–56 to controller 11 and through the controller to modulating signal modifier 7 and a modulating signal generator 20. To avoid repetitive disclosure, inverter 9 and the inventive modifier 7 will be explained by referring only to leg 39 as all three legs 39, 40, and 41 of the inverter 9 operate and are controlled in the same manner. Generator 20, modifier 7 and controller 11 operate together to turn the switching devices 12, 13 of leg 39 on and off in a repetitive sequence that alternately connects the high and low voltage rails 48, 49 to, and produces a series of high frequency voltage pulses at, terminal 31.

To this end, as well known in the controls art, generator 20 provides modulating waveforms $V_u$, $V_v$, $V_w$ for comparison to a triangular high frequency carrier signal $T_c$ by controller 11. The type of waveform provided by generator 20 may take any of several forms including, but not limited to, space vector, third harmonic PWM, two phase PWM, sinusoidal, etc. A selector input to generator 20 allows a system user to select the modulating waveform type. After the waveform type is selected, generator 20 provides the waveforms along with a selector signal indicating the waveform type as outputs. Hereinafter, because controller 11 operates on each of waveforms $V_u$, $V_v$, $V_w$ in a similar fashion, only operations with respect to a generic waveform $V_{mv}$ for controlling inverter leg 39 will be described in greater detail. When modulating waveform $V_{mv}$ is greater than the carrier signal $T_c$, controller 11 provides firing pulses to switches 12 and 13 to turn on switch 12 and turn off switch 13 there by linking terminal 31 to the positive DC rail 48. Similarly, when waveform $V_{mv}$ is less than the carrier signal value, controller 11 provides firing pulses that link terminal 31 to negative DC rail 49.

Modulating signal modifier 7 is positioned between generator 20 and controller 11, receives the modulating signals $V_{mv}$ and the selector signal (indicating waveform type) from generator 20 along with a DC bus voltage signal $V_{DC}$, a dwell time value $T_\alpha$ and the carrier signal $T_c$ and alters the modulating signals $V_{mv}$ in a manner consistent with the present invention thereby generating modified modulating signals $V'_{mv}$ (i.e., $V_u$, $V_v$ and $V_w$) that are used to drive controller 11.

Figure 7A:
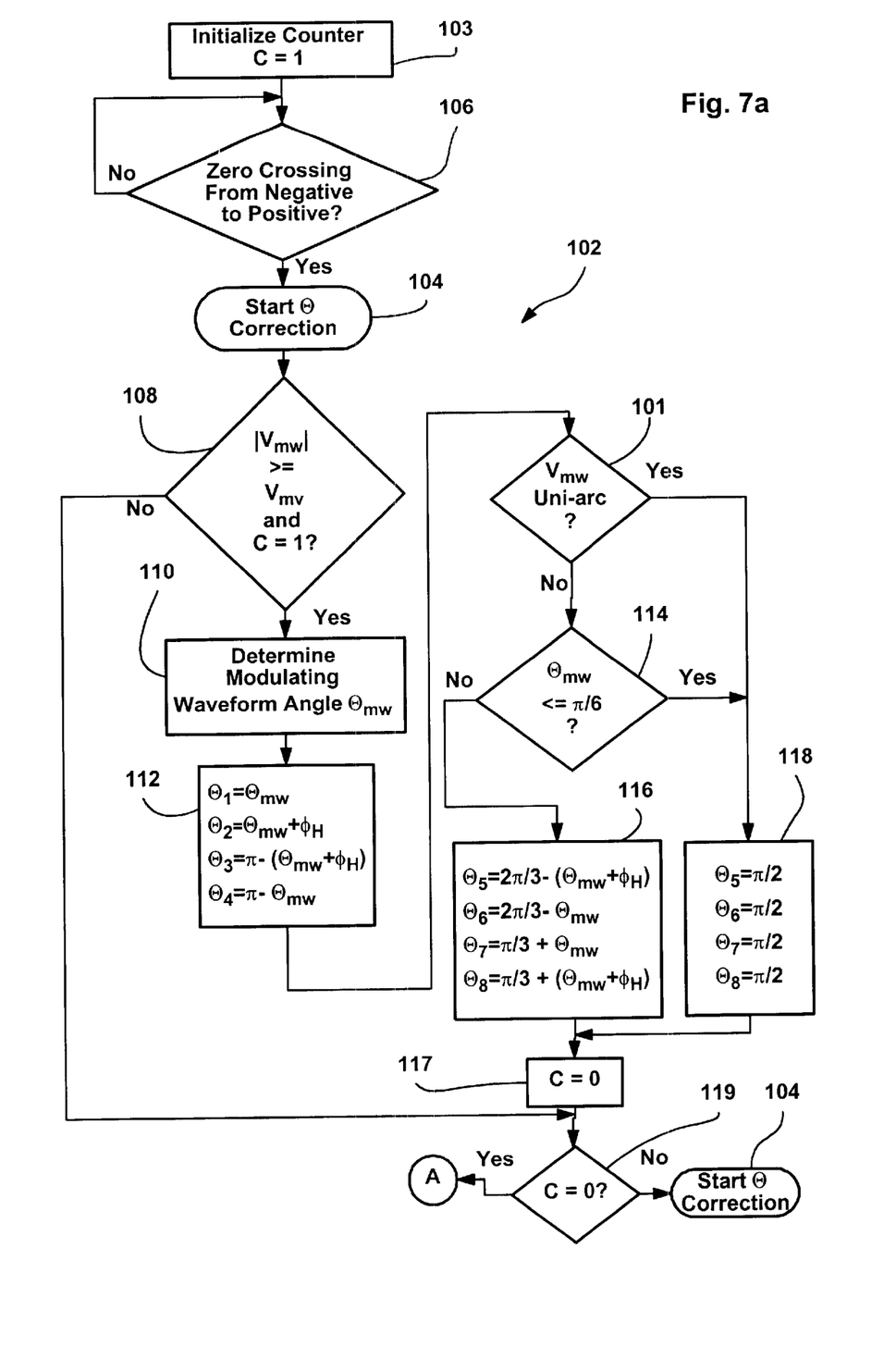
FIG. 7a is a flow chart illustrating a portion of the present invention.
Figure 7B:
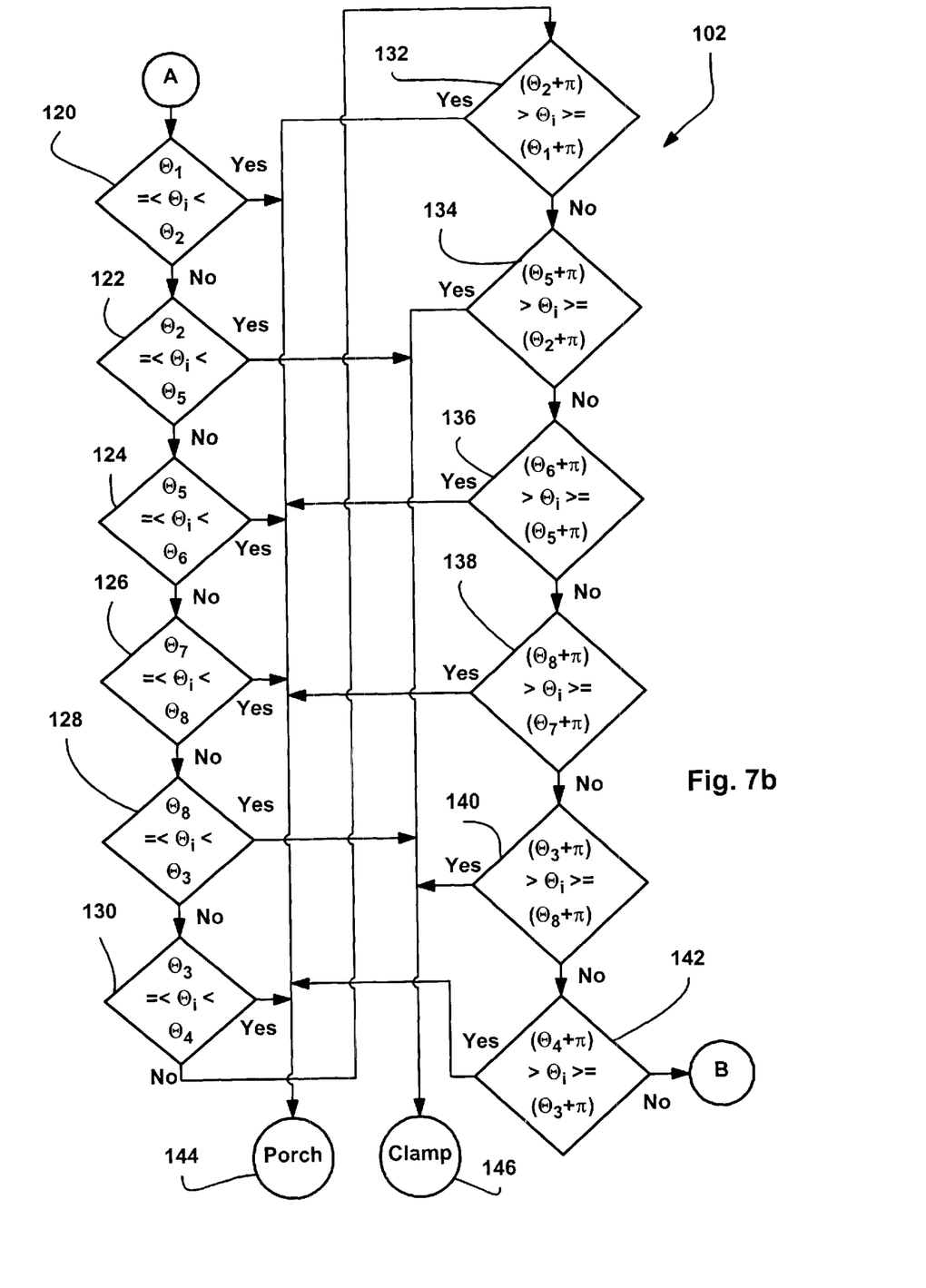
FIG. 7b is an extension of the flow chart of FIG. 7a and FIG. 7c is an extension of the flow charts illustrated in FIG. 7a and 7b.
Figure 7C:
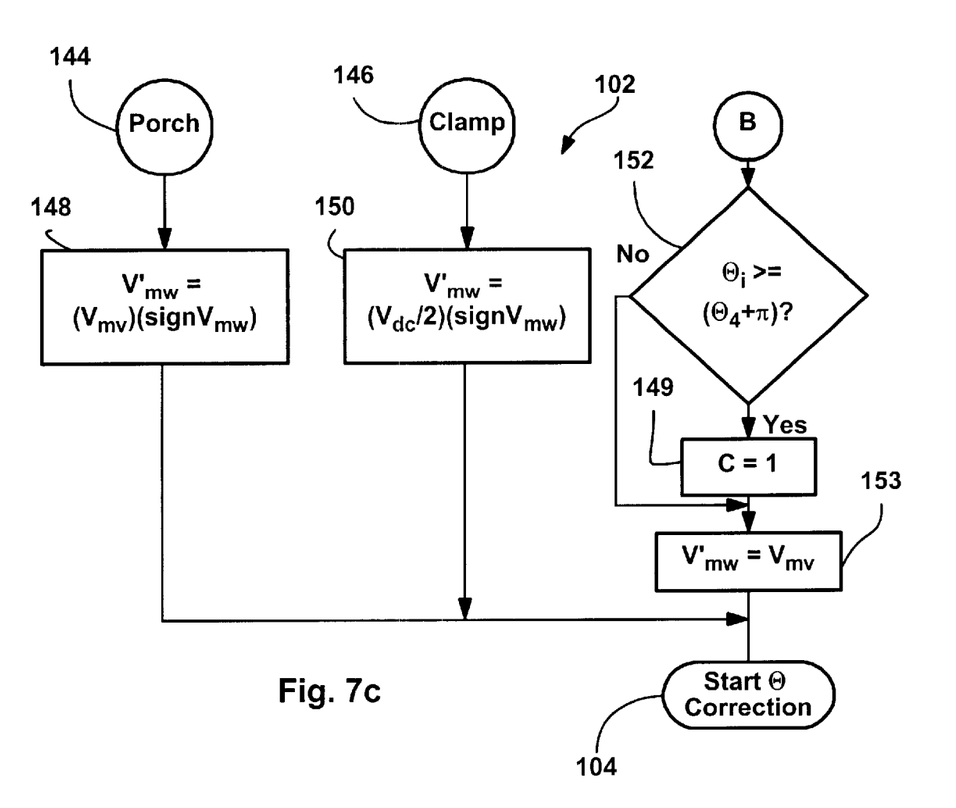

Referring now to FIGS. 7a–7c, an exemplary inventive method 102 performed by modifier 7 is illustrated. It should be appreciated that, while the process of FIGS. 7a through 7c is illustrated in the context of a single phase (i.e., the U phase), the process is also performed for each of the other two system phases. In addition, it is immaterial to the present invention whether or not the process is performed sequentially for the other two phases or in parallel.

Method 102 is performed every processor cycle as a function of an instantaneous modulating waveform angle )i. Referring also to FIGS. 4 and 5, at block 103, modifier 7 initializes a counter C so that counter C is initially equal to 1. Next, at block 106, modifier 7 determines whether or not waveform $V_{mw}$ is crossing the zero value from negative to positive. When waveform $V_{mw}$ crosses the zero value from negative to positive, a new cycle, for the purposes of the illustrated method, begins. In FIG. 5, the zero crossing point is at angle zero. When the zero crossing point occurs, control passes to block 104 which is the start of the θ correction process which is performed every processor cycle. From block 104 control passes to block 108. At block 108 modifier 7 compares the magnitude of the modulating waveform $V_{mw}$ to the maximum voltage magnitude value $V_{mv}$ and compares counter value C to one. While the magnitude of the modulating waveform $V_{mw}$ is less than the maximum magnitude $V_{mv}$, control cycles to block 119. Once the magnitude of the modulating waveform $V_{mw}$ is equal to the maximum value $V_{mv}$, control passes to block 110 where modifier 7 determines the instantaneous modulating waveform angle or pass through angle $\Theta_{mw}$. Next, at block 112, modifier 7 identifies each of the first through fourth angles $\Theta_1$, $\Theta_2$, $\Theta_3$ and $\Theta_4$ by solving Equations 4 through 7, respectively, above. Referring specifically to FIG. 5, each of the first through fourth angles are identified.

Referring still to FIG. 7a, control next passes to block 101 where modifier 7 uses the selector signal to determine whether or not the modulating waveform $V_{mw}$ is a uni-arc or a bi-arc waveform. Where the waveform $V_{mw}$ is a uni-arc waveform (e.g., a sinusoidal waveform), control passes to block 118 where each of fifth through eighth angles (i.e., angles $\Theta_5$, $\Theta_6$, $\Theta_7$ and $\Theta_8$) are set equal to π/2 and then control passes to block 117 where counter C is set equal to zero. Where the modulating waveform $V_{mw}$ is a bi-arc waveform like the space-vector waveform illustrated in FIG. 5, control passes to block 114.

At block 114, modifier 7 compare the pass through angle $\Theta_{mw}$ to angle π/6. Where pass through angle $\Theta_{mw}$ is less than or equal to angle π/6 (see FIG. 6), control again passes to block 118 where each of the fifth through eighth angles $\Theta_5$, $\Theta_6$, $\Theta_7$ and $\Theta_8$, respectively, is set equal to angle π/2 and then control passes again to block 117. However, referring again to block 114, where pass through angle $\Theta_{mw}$ is greater than angle π/6 (see FIG. 5), control passes to block 116 where Equations 8 through 11 above are solved to identify fifth through eighth angles $\Theta_5$, $\Theta_6$, $\Theta_7$ and $\Theta_8$, respectively. Thereafter, control passes to block 117.

Counter C is used to determine when angles $\Theta_1$, through $\Theta_8$ have been determined for a modulating waveform cycle such that modifier 7 does not attempt to redetermine the angles. When counter C is 1 angles $\Theta_1$ through $\Theta_8$ have to be determined while a counter C value of zero indicates that values $\Theta_1$ through $\Theta_8$ have been determined. Consistent with this convention, after values $\Theta_1$ through $\Theta_8$ have been determined at blocks 112, 116 and 118, at block 117 counter C is set equal to zero to indicate that over the remainder of the modulating waveform cycle, values $\Theta_1$ through $\Theta_8$ will be employed to modify the waveform. Control passes from block 117 to block 119.

At block 119 modifier 7 determines if counter C is zero or one. Where counter C is zero angles $\Theta_1$ through $\Theta_8$ have been determined for the remainder of the modulating waveform cycle and control passes to block 120 in FIG. 7b. Where counter C is equal to one at block 119 the most recently identified angles $\Theta_1$ through $\Theta_8$ have already been used to specify porches and clamping action during the preceding cycle and new angles $\Theta_1$ through $\Theta_8$ for the following (i.e., next) modulating waveform cycle have to be determined. For this reason, where counter C is equal to 1 control passes to block 104 in FIG. 7a where the $\Theta$ correction process proceeds during the next modifier processor cycle to identify $\Theta_1$ through $\theta_8\Theta$ values.

In FIG. 7b, throughout the process steps illustrated and during the positive half-cycle of the modulating waveform $V_{mv}$, modifier 7 continues to monitor the modulating waveform $V_{mw}$ during each processor cycle to identify the instantaneous modulating waveform angle $\Theta_i$ so that modifier 7 can determine during which modulating waveform segments to clamp the waveform to a DC bus, provide a maximum magnitude value porch or cause the modified modulating waveform to track the original modulating waveform. To this end, the various decision blocks illustrated in FIG. 7b are used to identify the waveform segments that should be modified to provide porches and the segments that should be modified to cause clamping action. Where a porch is to be generated, control is passed through flow chart connector 144 (also labeled "porch") to block 148 (see FIG. 7c) where the modified modulating waveform $V'_{mw}$ is determined by solving the following equation:

$$V'_{mw}=(V_{mw})(\text{sign}V_{mw}) \qquad \text{Eq. (12)}$$

When clamping action is to be performed, control passes through flow chart connector 146 (also labeled "clamp") to block 150 (see again FIG. 7c) where the modified modulating waveform $V'_{mw}$ is determined by solving the following equations:

$$V'_{mw} = \left(\frac{V_{DC}}{2}\right)(\text{sign}V_{mw}) \qquad \text{Eq. 13}$$

Once modified modulating waveform value $V'_{mw}$ is set, the value is latched in either hardware or software until changed via looping through the process illustrated another time (i.e., during another processor cycle). Thereafter, as illustrated in FIG. 7c, control passes back to block 104 in FIG. 7a.

Figure 4:
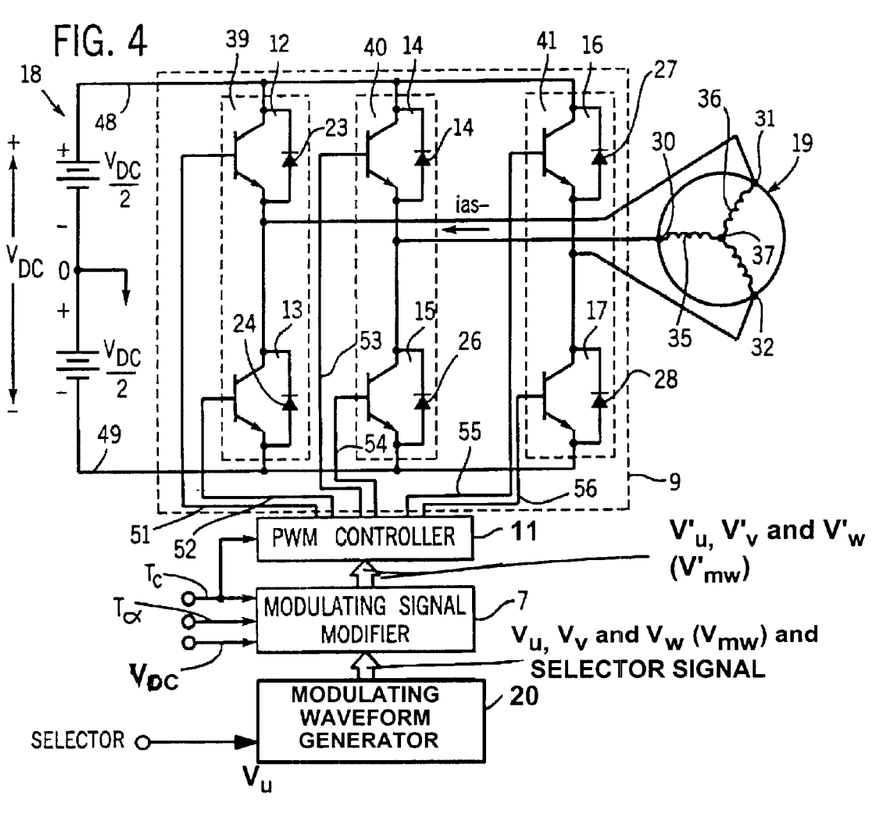
FIG. 4 is a schematic of an inventive motor controller.

Referring still again to FIG. 7b and also to FIGS. 4 and 5, at block 120, where instantaneous modulating waveform signal $\zeta_i$ is greater than or equal to angle $\Theta_1$ and less than angle $\Theta_2$, control passes to block 148 in FIG. 7c where modifier 7 forms a porch. At block 122 where instantaneous angle $\Theta_i$ is greater than or equal to angle $\Theta_2$ and is less than angle $\Theta_5$, control passes to block 150 where modifier 7 clamps the modified waveform $V'_{mw}$ to the positive DC bus (i.e., the sign of the modulating waveform $V_m$ is positive).

Continuing, at block 124, when instantaneous angle $\Theta_i$ is greater than or equal to angle $\Theta_5$ and is less than angle $\Theta_6$, at block 148 modifier 7 causes a porch. Similarly, at blocks 126 and 130, when instantaneous angle $\Theta_i$ is greater than or equal to angle $\Theta_7$ and is less than angle $\Theta_8$, or is greater than or equal to angle $\Theta_3$ and less than angle $\Theta_4$, modifier 7 causes a porch at block 148. At block 128, when instantaneous angle $\Theta_4$, is greater than or equal to angle $\Theta_8$ and is less than angle $\Theta_3$, modifier 7 clamps the modified waveform to the positive DC bus at block 150.

At the end of block 130, control passes to block 132. Blocks 132, 134, 136, 138, 140 and 142 operate in a fashion similar to the fashion described above with respect to blocks 120–130, except that the angles compared to the instantaneous angle $\Theta_i$ correspond to the negative half-cycle of the modulating waveform following the positive half-cycle. To this end, angle $\pi$ is added to each of angles $\Theta_1$ through $\Theta_8$ and a process similar to the process described above is performed with the exception that negative maximum value $V_{mv}$ is used to form porches and clamping is to the negative DC bus (i.e., at blocks 148 and 150 in FIG. 7c the sign of magnitude $V_{mv}$ is negative). At block 142, where the conditions of block 142 (and all other decision blocks in FIG. 7b for that matter) are not met, either the modulating waveform angle $\Theta_i$ is between porch periods specified by angles $\Theta_1$ through $\Theta_8+\pi$ or all of the modulating waveform modifications during the instantaneous modulating waveform cycle have been completed and control passes to block 152 in FIG. 7c.

At block 152 modifier 7 compares the instantaneous modulating waveform angle $\Theta_i$ to the angle $\Theta_4+\pi$ to determine whether or not all of the modification corresponding to the instantaneous cycle have been completed. Where instantaneous angle $\Theta_i$ is less than $\Theta_4+\pi$, control passes to block 153 where the modifier output waveform $V'_{mw}$ is set equal to the unmodified waveform $V_{mv}$ and thereafter control passes back to block 104 in FIG. 7a to continue the modification process. Referring still to decision block 152, where instantaneous angle $\Theta_i$ is greater than or equal to angle $\Theta_4+\pi$, control passes to block 149 where counter C is again set equal to one indicating that new angles $\Theta_1$ through $\Theta_8$ have to be determined. After count C is set equal to 1 control again passes to block 153 where modifier output waveform $V'_{mw}$ is set equal to the original waveform $V_{mw}$. Thereafter control again passes to block 104 in FIG. 7a.

It should be understood that the methods and apparatuses described above are only exemplary and do not limit the scope of the invention, and that various modifications could be made by those skilled in the art that would fall under the scope of the invention. For example, while the invention is described above as one where the pass through and delimit angles for a complete modulating waveform cycle are determined as a function of a first pass through angle that occurs after a negative to positive modulating waveform zero crossing, it should be appreciated that other pass through angles could be used to identify following pass through and delimit angles. For instance, the first pass through angle following a zero crossing from positive to negative could be employed in a fashion similar to that described above. Moreover, in the case of a bi-arc modulating waveform, a central pass through angle (e.g., see angle $\Theta_7$ in FIG. 5) could be used to identify following pass through angles by using the symmetrical relationships described above.

In addition, while the invention is described above as one wherein new cross through and delimit angles are identified each modulating waveform cycle, where a modulating waveform remains unchanged, the pass through delimit angles may need to be identified only once during a commissioning procedure and could thereafter be used to modify the modulating waveform during each of many consecutive waveform cycles. In the alternative, the pass through and delimit angles may be identified and reprocessed periodically to ensure accuracy.

To apprise the public of the scope of this invention, the following claims are made:

1. A method to be used with a motor controller including a signal generator, a PWM controller and an inverter, the generator providing modulating waveforms to the PWM controller which compares the modulating waveforms with a carrier signal to generate firing pulses which control the inverter, the inverter providing exciting voltage to a motor corresponding to the firing pulses, the voltage having a maximum intended amplitude, the method for substantially eliminating greater than twice motor overvoltage by modifying the modulating waveforms to provide modified modulating waveforms, the method comprising the steps of, for each modulating waveform:
 (a) determining a maximum voltage magnitude of the modulating waveform above which greater than twice motor overvoltage is known to occur;
 (b) comparing the modulating waveform to the maximum voltage magnitude;
 (c) when the modulating waveform magnitude equals the maximum voltage magnitude, identifying the modulating waveform angle as a first pass through angle;
 (d) using the first pass through angle to identify at least one subsequent pass through angle at which the modulating waveform should equal the maximum voltage magnitude; and
 (d) modifying the modulating waveform as a function of the first and at least one subsequent pass through angles thereby providing a modified waveform having characteristics which do not cause greater than twice overvoltage.

2. The method of claim 1 wherein the modulating waveform occurs over a $2\pi$ period, the inverter generates the firing pulses by alternately connecting motor phases between positive and negative DC buses, during each half cycle of the modulating waveform, the modulating waveform magnitude is greater than the maximum voltage magnitude during an overvoltage period, $\phi_H$ is a porch angle corresponding to N carrier signal periods and is set by a controller operator, the step of identifying the modulating waveform angle includes the step of identifying the angle at which the modulating waveform passes through the maximum magnitude value after the waveform passes from a negative value through zero to a positive value and, wherein, the step of using the pass through angle to identify at least one subsequent pass through angle includes the step of identifying a fourth angle as $\pi$ less the first pass through angle and, wherein, the step of modifying includes the steps of:
 identifying a second angle as the first pass through angle plus porch angle $\phi_H$, a third angle as $\pi$ less the sum of (the first pass through angle and the porch angle $\phi_H$) and,
 during the $2\pi$ modulating waveform segment following the first pass through angle:
  (i) setting the modulating waveform equal to the positive maximum voltage magnitude between the first and second angles and between the third and fourth angles; and
  (ii) setting the modulating waveform equal to the negative maximum voltage magnitude between the first angle plus $\pi$ and second angle plus $\pi$ and between the third angle plus $\pi$ and fourth angle plus $\pi$.

3. The method of claim 2 wherein the step of modifying further includes the steps of setting the modulating waveform equal to the positive DC bus value between the second and third angles and setting the modulating waveform equal to the negative DC bus value between the second angle plus $\pi$ and the third angle plus $\pi$.

4. The method of claim 2 wherein the step of modifying further includes the steps of:
 determining if the modulating waveform is a uni-arc waveform or a bi-arc waveform and, if the modulating waveform is a bi-arc waveform, comparing the modulating angle to a threshold angle and, where the modulating angle is greater than the threshold angle, further modifying the modulating waveform.

5. The method of claim 4 wherein the threshold angle is $\pi/6$.

6. The method of claim 4 wherein the step of further modifying includes the steps of:
 identifying a fifth angle as $2\pi/3$ less the sum of (the first pass through angle and the porch angle $\phi_H$), identifying a sixth angle as $2\pi/3$ less the first pass through angle, identifying a seventh angle as $\pi/3$ plus the first pass through angle and identifying an eighth angle as $\pi/3$ plus the sum of (the first pass through angle and the porch angle $\phi_H$);
 during the $2\pi$ modulating waveform segment following the first pass through angle:
  (i) setting the modulating waveform equal to the positive maximum voltage magnitude between the fifth and sixth angles and between the seventh and eighth angles; and
  (ii) setting the modulating waveform equal to the negative maximum voltage magnitude between the fifth angle plus $\pi$ and sixth angle plus $\pi$ and between the seventh angle plus n and eighth angle plus $\pi$.

7. The method of claim 6 wherein the step of modifying further includes the steps of, setting the modulating waveform equal to the positive DC bus value between the second and fifth angles and between the eighth and third angles and setting the modulating waveform equal to the negative DC bus value between the second angle plus $\pi$ and fifth angle plus $\pi$ and between the eighth angle plus $\pi$ and third angle plus $\pi$.

8. The method of claim 7 wherein the step of modifying further includes the step of, when the first pass through angle is less than or equal to the threshold angle, setting the modulating waveform equal to the positive DC bus value between the second and third angles and setting the modulating waveform equal to the negative DC bus value between the second angle plus $\pi$ and third angle plus $\pi$.

9. The method of claim 8 wherein the method is repeated every $2\pi$ segment of the modulating waveform.

10. The method of claim 1 wherein the motor controller provides a dwell time signal, a bus voltage signal and a carrier period signal and the step of determining a maximum voltage magnitude includes the step of mathematically combining the dwell time, bus voltage and carrier period signals to provide the maximum voltage magnitude.

11. An apparatus to be used with a motor controller including a signal generator, a PWM controller and an inverter, the generator providing modulating waveforms to the PWM controller which compares the modulating waveforms with a carrier signal to generate firing pulses which control the inverter, the inverter providing exciting voltage to a motor corresponding to the firing pulses, the voltage having a maximum intended amplitude, the apparatus for substantially eliminating greater than twice motor overvoltage by modifying the modulating waveforms to provide modified modulating waveforms, the apparatus comprising:
 a processor running a pulse sequencing program to perform the steps of: for each modulating waveform:
  (a) determining a maximum voltage magnitude of the modulating waveform above which greater than twice motor overvoltage is known to occur;
  (b) comparing the modulating waveform to the maximum voltage magnitude;
  (c) when the modulating waveform magnitude equals the maximum voltage magnitude, identifying the modulating waveform angle as a first pass through angle;

(d) using the first pass through angle to identify at least one subsequent pass through angle at which the modulating waveform should equal the maximum voltage magnitude; and (d) modifying the modulating waveform as a function of the first and at least one subsequent pass through angles thereby providing a modified waveform having characteristics which do not cause greater than twice overvoltage.

12. The apparatus of claim 11 wherein the modulating waveform occurs over a $2\pi$ period, the inverter generates the firing pulses by alternately connecting motor phases between positive and negative DC buses, during each half cycle of the modulating waveform, the modulating waveform magnitude is greater than the maximum voltage magnitude during an overvoltage period, $\phi_H$ is a porch angle corresponding to N carrier signal periods and is set by a controller operator, the processor performs the sequence to identify the modulating waveform angle by identifying the angle at which the modulating waveform passes through the maximum magnitude value after the waveform passes from a negative value through zero to a positive value and, wherein, the processor performs the program to use the pass through angle to identify at least one subsequent pass through angle by performing the step of identifying a fourth angle as $\pi$ less the first pass through angle and performs the step of modifying by performing the steps of:

identifying a second angle as the first pass through angle plus porch angle $\phi_H$, a third angle as $\pi$ less the sum of (the first pass through angle and the porch angle $\phi_H$) and, during the $2\pi$ modulating waveform segment following the first pass through angle:
  (i) setting the modulating waveform equal to the positive maximum voltage magnitude between the first and second angles and between the third and fourth angles; and
  (ii) setting the modulating waveform equal to the negative maximum voltage magnitude between the first angle plus $\pi$ and second angle plus $\pi$ and between the third angle plus $\pi$ and fourth angle plus $\pi$.

13. The apparatus of claim 12 wherein the processor performs the step of modifying by further performing the steps of setting the modulating waveform equal to the positive DC bus value between the second and third angles and setting the modulating waveform equal to the negative DC bus value between the second angle plus $\pi$ and the third angle plus $\pi$.

14. The apparatus of claim 12 wherein the processor further performs the modifying step by performing the steps of:

determining if the modulating waveform is a uni-arc waveform or a bi-arc waveform and, if the modulating waveform is a bi-arc waveform, comparing the modulating angle to a threshold angle and, where the modulating angle is greater than the threshold angle, further modifying the modulating waveform.

15. The apparatus of claim 14 wherein the threshold angle is $\pi/6$.

16. The apparatus of claim 14 wherein the processor performs the step of further modifying by performing the steps of:

identifying a fifth angle as $2\pi/3$ less the sum of (the first pass through angle and the porch angle $\phi_H$), identifying a sixth angle as $2\pi/3$ less the first pass through angle, identifying a seventh angle as $\pi/3$ plus the first pass through angle and identifying an eighth angle as $\pi/3$ plus the sum of (the first pass through angle and the porch angle $\phi_H$);

during the $2\pi$ modulating waveform segment following the first pass through angle:
  (i) setting the modulating waveform equal to the positive maximum voltage magnitude between the fifth and sixth angles and between the seventh and eighth angles; and
  (ii) setting the modulating waveform equal to the negative maximum voltage magnitude between the fifth angle plus $\pi$ and sixth angle plus $\pi$ and between the seventh angle plus $\pi$ and eighth angle plus $\pi$.

17. The apparatus of claim 16 wherein the processor further performs the step of modifying by performing the steps of, setting the modulating waveform equal to the positive DC bus value between the second and fifth angles and between the eighth and third angles and setting the modulating waveform equal to the negative DC bus value between the second angle plus $\pi$ and fifth angle plus $\pi$ and between the eighth angle plus $\pi$ and third angle plus $\pi$.

18. The apparatus of claim 17 wherein the processor performs the step of modifying by further performing the steps of, when the first pass through angle is less than or equal to the threshold angle, setting the modulating waveform equal to the positive DC bus value between the second and third angles and setting the modulating waveform equal to the negative DC bus value between the second angle plus and third angle plus $\pi$.

19. The apparatus of claim 18 wherein the processor runs the pulse sequencing program anew every $2\pi$ segment of the modulating waveform.

20. The apparatus of claim 11 wherein the motor controller provides a dwell time signal, a bus voltage signal and a carrier period signal and wherein the processor performs the step of determining a maximum voltage magnitude by mathematically combining the dwell time, bus voltage and carrier period signals to provide the maximum voltage magnitude.

21. A method to be used with a motor controller including a signal generator, a PWM controller and an inverter, the generator providing modulating waveforms to the PWM controller which compares the modulating waveforms with a carrier signal to generate firing pulses which control the inverter, the inverter providing exciting voltage to a motor corresponding to the firing pulses, the voltage having a maximum intended amplitude, the modulating waveform occurs over a $2\pi$ period, the inverter generates the firing pulses by alternately connecting motor phases between positive and negative DC buses, during each half cycle of the modulating waveform, the modulating waveform magnitude is greater than the maximum voltage magnitude during an overvoltage period, $\phi_H$ is a porch angle corresponding to N carrier signal periods and is set by a controller operator, the method for substantially eliminating greater than twice motor overvoltage by modifying the modulating waveforms to provide modified modulating waveforms, the method comprising the steps of, for each modulating waveform:

(a) determining a maximum voltage magnitude of the modulating waveform above which greater than twice motor overvoltage is known to occur;

(b) comparing the modulating waveform to the maximum voltage magnitude;

(c) identifying a first pass through angle as the angle at which the modulating waveform passes through the maximum magnitude value after the waveform passes from a negative value through zero to a positive value;

(d) identifying a second angle as the first pass through angle plus porch angle $\phi_H$;

(e) identifying a third angle as $\pi$ less the sum of (the first pass through angle and the porch angle $\phi_H$);

(f) identifying a fourth angle as $\pi$ less the first pass through angle;

(g) during the $2\pi$ modulating waveform segment following the first pass through angle:

(1) setting the modulating waveform equal to the positive maximum voltage magnitude between the first and second angles and between the third and fourth angles; and   (2) setting the modulating waveform equal to the negative maximum voltage magnitude between the first angle plus $\pi$ and second angle plus $\pi$ and between the third angle plus $\pi$ and fourth angle plus $\pi$ (h) determining if the modulating waveform is a uni-arc or a bi-arc waveform;

(i) where the modulating waveform is a bi-arc waveform, comparing the first pass through angle to angle $\pi/6$ and, where the first pass through angle is greater than angle $\pi/6$, further modifying the modulating waveform by:

(1) identifying a fifth angle as $2\pi/3$ less the sum of (the first pass through angle and the porch angle $\phi_H$);

(2) identifying a sixth angle as $2\pi/3$ less the first pass through angle;

(3) identifying a seventh angle as $\pi/3$ plus the first pass through angle;

(4) identifying an eighth angle as $\pi/3$ plus the sum of (the first pass through angle and the porch angle $\phi_H$);

(5) during the $2\pi$ modulating waveform segment following the first pass through angle, setting the modulating waveform equal to the positive maximum voltage magnitude between the fifth and sixth angles and between the seventh and eighth angles and setting the modulating waveform equal to the negative maximum voltage magnitude between the fifth angle plus $\pi$ and sixth angle plus $\pi$ and between the seventh angle plus $\pi$ and eighth angle plus $\pi$.

22. The method of claim 21 wherein, when the modulating waveform is a uni-arc waveform the method further includes the step of setting the setting the modulating waveform equal to the positive DC bus value between the second and third angles and setting the modulating waveform equal to the negative DC bus value between the second angle plus $\pi$ and third angle plus $\pi$, when the modulating waveform is a bi-arc waveform and the first pass through angle is less than or equal to angle $\pi/6$, the method further includes the step of setting the setting the modulating waveform equal to the positive DC bus value between the second and third angles and setting the modulating waveform equal to the negative DC bus value between the second angle plus $\pi$ and third angle plus $\pi$ and, when the modulating waveform is a bi-arc waveform and the first pass through angle is greater than angle $\pi/6$, the method further includes the step of setting the setting the modulating waveform equal to the positive DC bus value between the second and fifth angles and between the eighth and third angles and setting the modulating waveform equal to the negative DC bus value between the second angle plus $\pi$ and the fifth angle plus $\pi$ and between the eighth angle plus $\pi$ and the third angle plus $\pi$.

\* \* \* \* \*